Jan. 1, 1952　　　G. W. REILLY, JR　　　2,581,205
WEIGHING SYSTEM FOR A PROCESSING OPERATION
Filed June 7, 1950　　　2 SHEETS—SHEET 1
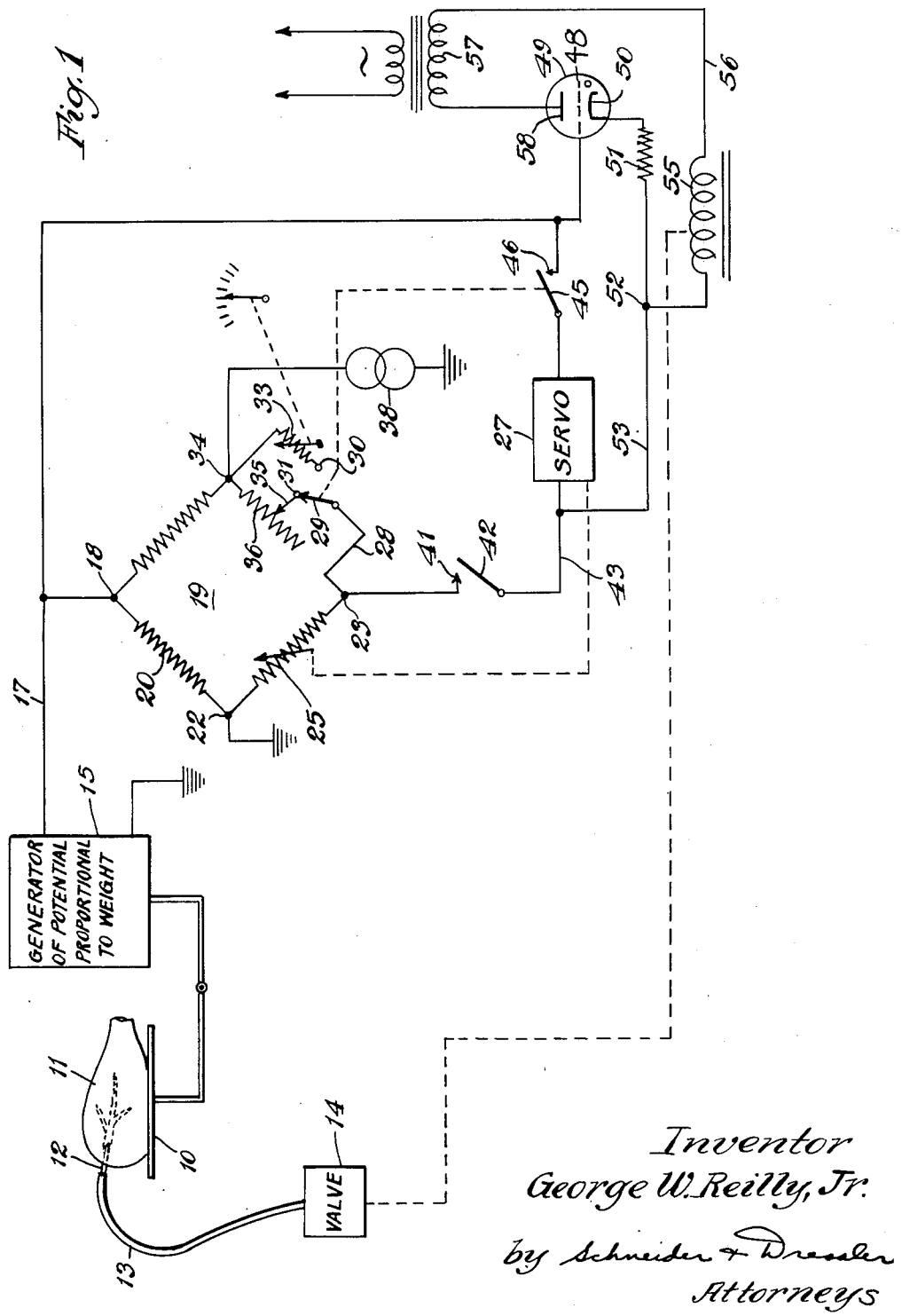
Inventor
George W. Reilly, Jr.
by Schneider & Dressler
Attorneys

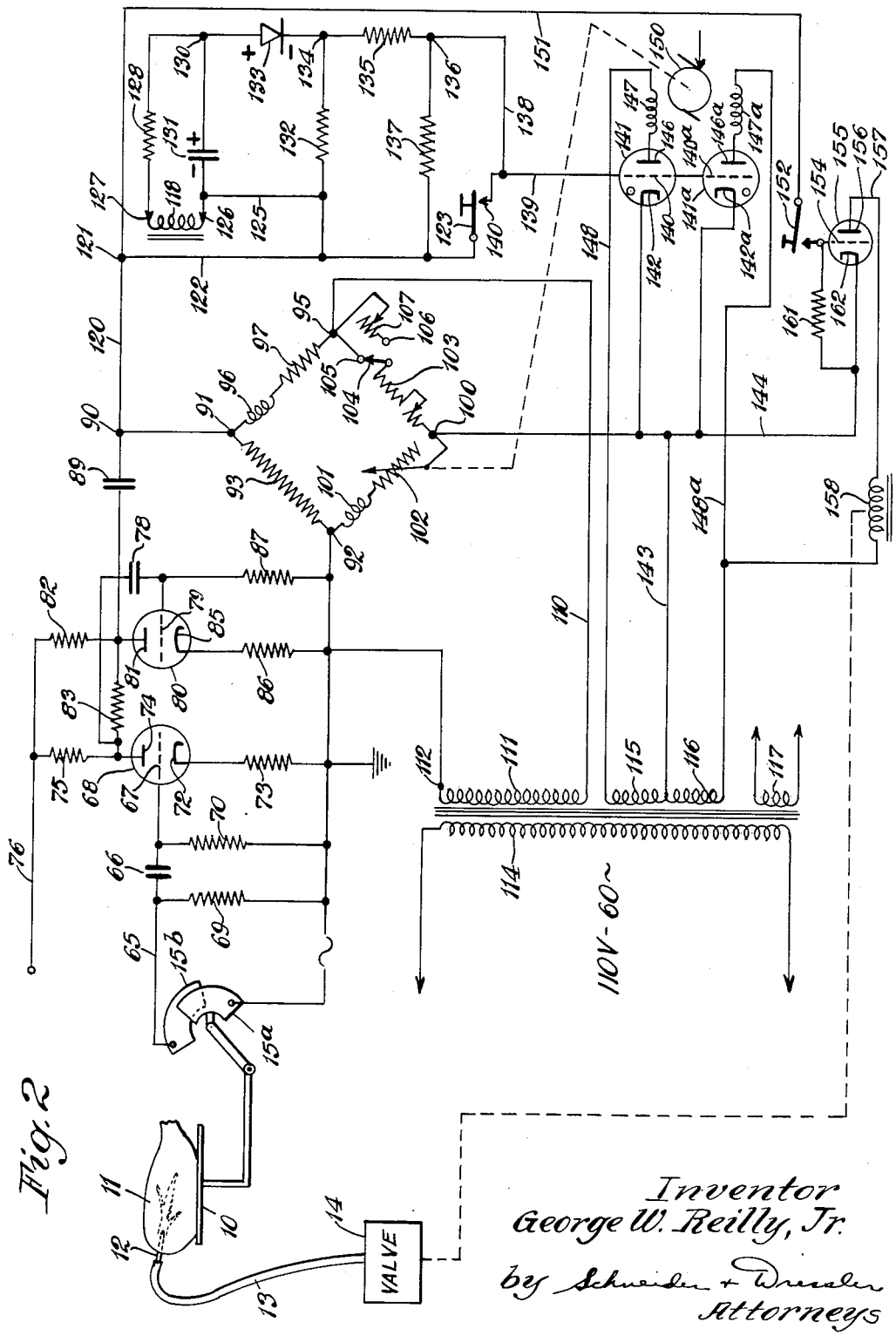

Patented Jan. 1, 1952

2,581,205

UNITED STATES PATENT OFFICE 2,581,205

WEIGHING SYSTEM FOR A PROCESSING OPERATION

George W. Reilly, Jr., Minneapolis, Minn., assignor to Wilson & Co., Inc., a corporation of Delaware Application June 7, 1950, Serial No. 166,708

6 Claims. (Cl. 99—256)

The present invention relates to weighing systems for use in processing operations wherein an article to be processed changes in weight during processing and wherein the desired change in weight during the processing is proportional to the original or base weight of the article prior to processing, irrespective of the value of that original weight. In the operation of the system of the present invention, the initiation and termination of the processing are controlled to secure the desired proportional change in weight during the processing operation.

In the prior copending applications of Lyman L. Campbell, Serial No. 17,520, filed March 27, 1948, and of Walter E. Moss et al., Serial No. 149,078, filed March 11, 1950, weighing systems are described wherein the article being processed may be, for example, a ham into which a certain percentage by weight of brine is to be pumped through the arteries of the ham. As a rule, hams for processing range in weight from about eight pounds to as much as twenty pounds and it is customary to add about 8% brine. In this particular application of such system, the weight of the article during processing is increased but, as explained in the above identified applications, the weighing systems described and claimed in these applications as well as the instant weighing system are adapted for use in processing any article wherein the weight is increased or decreased by a fixed percentage during processing.

As is more fully disclosed in said prior applications, the addition or subtraction of a constant proportion of a base weight lying within a range of base weights involves an exponential function. In the systems described in said applications, the exponential factor in the operating characteristics of the machine is present in the mechanical parts of the system and cooperates with the scale used for weighing the article during processing. Under certain conditions it may be desirable to reduce to a minimum the mechanical elements operatively associated with the scale and to incorporate the exponential operating characteristics of the system in an entirely different portion of the system. The present invention relates to such a weighing system wherein the weight responsive portion of the system need only generate a potential whose magnitude is a linear function of the weight of the article being processed. Thereafter, a system embodying the present invention utilizes such a potential so that a predetermined proportional change in such a potential due to a change in the weight of the article during processing will suffice for terminating or otherwise controlling the processing of the article.

In order to simplify the explanation, it will be assumed that the article being processed is a ham. In general, the scale first determines the base weight of the ham prior to processing and in connection with this determination there is generated a potential having a value which is a linear function of the base weight of the ham.

A system embodying the present invention in general utilizes a potential having a value which is a linear function of the weight of the ham. The potential corresponding to the base weight of the ham prior to processing is utilized in a bridge which is brought to balance, an arm of the bridge being varied in proportion to the base weight potential. Thereafter, the bridge is unbalanced by a predetermined amount, and processing of the ham is initiated. The sense of the unbalance of the bridge is such that the increase in weight of the ham during pumping tends to bring the bridge into balance. When the bridge has regained balance, processing is terminated. Thus a bridge is utilized having a condition of balance corresponding to the base weight of the ham which condition will be referred to as the base weight balance. The second condition of bridge balance is when the ham has been pumped to the desired weight in which case the bridge balance may be considered as the process termination balance.

For a more complete description of the invention, reference will now be made to the drawings wherein Fig. 1 is a diagrammatic showing of a generalized form of the invention. Fig. 2 shows a complete system illustrating one form which the invention may take.

Referring to Fig. 1, any suitable scale having platform 10, may be used, preferably the scale employed is one having a mechanical coupling between the platform and a movable element such that the movement of the latter is a linear function of the weight on the scale. Such couplings are conventional in scales for the operation of indicators, and hence are not shown. Scale 10 has ham 11 disposed thereon, this ham having needle 12 clamped to an artery thereof in preparation for pumping. Needle 12 is connected by hose 13 to brine valve 14 controlling a supply of brine from a source not shown.

Mechanically coupled to scale platform 10 is generator 15 adapted to generate or control a potential having an amplitude which is a direct function of the weight of ham 11. Thus generator 15 may be a photoelectric system and amplifier and include a suitable light source and valve for modulating the amount of light in proportion to the weight of ham 11. Generator 15 may also be a potentiometer system similar to float-controlled systems used for registering gasoline in automobiles and liquids in tanks. Instead of the float in such a system, an arm mechanically coupled to platform 10 will be used for controlling or varying the amount of resistance. Other means for obtaining either direct or alternating potential having an amplitude which is a linear function of weight are well known and may be used as a generator.

Generator 15 has one output terminal grounded and has its other output terminal connected to wire 17. Wire 17 is connected to point 18 of bridge 19. Bridge 19 has resistance arm 20 connected between bridge point 18 and bridge point 22, the latter point being grounded. Between bridge point 22 and bridge point 23 is resistance arm 25, this resistor being variable. While resistor 25 may be manually varied, it is preferred to utilize Servo means 27 of any suitable type. Inasmuch as Servo mechanisms are well known and highly developed, a detailed description thereof is not essential. Bridge point 23 is connected by wire 28 to movable contact 29 of a switch. Movable contact 29 cooperates with fixed contacts 30 and 31. Fixed contact 30 is connected through resistor 33 to bridge point 34 while fixed contact 31 of the switch is connected to wiper 35 cooperating with resistor 36 having one end connected to bridge point 34.

Between bridge point 34 and ground is connected any suitable source of potential 38, such source may be either alternating or direct. From bridge point 23 wire 40 goes to fixed contact 41 of a switch having movable contact 42. Movable contact 42 of the switch is connected by wire 43 to one terminal of Servo mechanism 27. The other terminal of Servo mechanism 27 is connected to movable contact 45 of a switch. Movable contact 45 cooperates with fixed contact 46, which contact is connected to wire 17. Wire 17 is also connected to control grid 48 of gas tube 49. Tube 49 has cathode 50 connected through bias resistor 51 to junction 52. From junction 52 wire 53 goes to and is connected to wire 43. From junction 52 a connection goes to winding 55 for operating brine valve 14. The other terminal of winding 55 is connected by wire 56 through any suitable source of alternating current such as transformer secondary 57 to anode 58 of tube 49.

The operation of the system is as follows: In order to put the system into operative condition, switch 42 is closed against contact 41. Switches 29 and 45 remain in the position shown during initial weighing of ham 11. Assuming that scale 10 has come to rest in a position corresponding to the base weight of ham 11, a certain potential will be impressed upon bridge point 18. Bridge point 34 will have a predetermined potential impressed thereon due to potential source 38. By varying bridge arm 25, it is possible to balance bridge 19 so that with the base weight potential on point 18 of the bridge there will be no difference in potential between points 18 and 23. It is understood that the arm between points 23 and 34 will include resistor 33. Now arm 25 is fixed in value during processing. Switches 29 and 45 are operated. When switch 45 is operated, the Servo circuit is opened so that Servo mechanism 27 is inoperative. When switch 29 is operated, it is closed against contact 35 and resistor 33 is no longer in the bridge arm. Instead, resistor 36 forms part of the bridge system, the actual part of the resistor in the bridge arm being determined by the position of wiper 35. By suitable adjustment of the position of wiper 35 on resistor 36, it is possible to rearrange the ratio of resistances between bridge points 23 and 34 as one arm and either of the two arms connected to bridge point 18 so that a predetermined change in the resistance ratio is obtained. Thus for example, assuming that the ratio of the resistance of the arm including 33 to that of arm 20 is 1, then the resistance due to the active portion of arm 36 over the resistance of arm 20 may be made 1.08 if an 8% increase in ham weight is to be desired. Movable wiper 35 of the potentiometer may be attached to a pointer moving over a scale indicating percentage increase or decrease, if desired in the article being processed.

With the bridge now in the processing position, it will be clear that a potential with respect to ground of bridge point 18 will have to vary by a predetermined proportion against the fixed potential from 38 in order to bring the bridge to a balanced condition. As shown in Fig. 1, upon unbalance of bridge 19 due to the initiation of processing and the change in the bridge arm from 33 to part of resistor 36, tube 49 may be arranged to either cut-in from a normally non-firing condition or cut-out from a normally firing condition to open valve 14. It is clear that valve 14 may either be normally closed or normally open and that tube 49 may be either normally firing or normally blocked and that the change in the tube condition and valve condition due to initial unbalance of bridge 19 and subsequent balancing of the bridge may be accomplished in a manner well understood in the art.

It is apparent, therefore, that a bridge system is utilized wherein a potential varying in proportion to the weight of the ham is balanced against a fixed potential. This bridge is so arranged that one arm is varied to bring the bridge into balance for conditions corresponding to the base weight of the ham. Thereafter, this arm remains fixed and another arm is changed in a manner to unbalance the bridge to a predetermined degree. The unbalanced condition of the bridge requires a predetermined proportion of potential variation corresponding to weight variation of the ham in order to bring the bridge into final balanced condition corresponding to a termination of the processing.

Referring now to Fig. 2, the scale for weighing the ham has platform 10 upon which ham 11 may rest. Ham 11 has needle 12 clamped properly in position and this needle may be supplied with brine from hose 13 and valve 14. Mechanically coupled to platform 10 is movable member 15a forming the rotor or movable part of a condenser, the coupling being preferably such that the movement of the member 15a is a linear function of the weight on the scale. The fixed plate of the condenser is indicated by 15b. Movable plate 15a is connected to ground through a suitable source of alternating current at a substantially constant frequency. The frequency of the source is such that variation of capacitance of the condenser over the operating range of the scale will result in a substantial change in the reactance of the condenser to the frequency selected. Thus, the frequency may be of the order of about one thousand cycles while the generator may be stable so that variation in capacitance in the condenser will have substantially no effect upon the impressed frequency.

Fixed plate 15b is connected by wire 65 through coupling condenser 66 to control grid 67 of vacuum tube amplifier 68. Resistors 69 and 70 are connected respectively between ground and the opposite sides of coupling condenser 66. Tube 68 has cathode 72 connected to ground through bias resistor 73. Tube 68 has anode 74 connected through load resistor 75 to wire 76 connected to the positive terminal of a suitable source of potential.

Anode 74 of tube 68 is also connected through coupling condenser 78 to control grid 79 of a second amplifier 80. Anode 81 of amplifier 80 is connected through load resistor 82 to wire 76 and is also connected through resistor 83 to anode 74 of tube 68. Resistor 83 provides a negative feedback to tube 68 and stabilizes the stages. Amplifier 80 has cathode 85 connected to ground through bias resistor 86 while control grid 79 of this amplifier is also connected to ground through resistor 87.

Anode 81 is connected through coupling condenser 89 to junction 90 which junction is connected to point 91 of a bridge. Connected between bridge point 91 and grounded bridge point 92 is resistor 93 forming one arm of the bridge. Connected between bridge point 91 and bridge point 95 are choke 96 and resistor 97. Between bridge point 92 and bridge point 100 are connected choke 101 and variable resistor 102. Connected to bridge point 100 is one terminal of resistor 103. The other terminal of this resistor is connected to movable switch contact 104 cooperating with fixed contacts 105 and 106. Contact 105 of the switch is connected directly to bridge point 95. Contact 106 of the switch is connected through potentiometer 107 to bridge point 95.

Bridge point 95 is connected by wire 110 to one terminal of transformer winding 111, the other terminal 112 of this winding being grounded. Secondary 111 is coupled to primary winding 114 of a power transformer and is adapted to be energized from a conventional 110 volt 60 cycle line. Additional secondary windings 115, 116 and 117 are provided. Winding 117 supplies current to energize the heaters of the various vacuum and gas tubes in the system.

Referring now to junction 90, wire 120 runs from this junction to junction 121. From junction 121 wire 122 goes to movable contact 123 of a switch. Connected to wire 122 is a bias potential generating system. Thus from wire 122, a connection is made by wire 125 to terminal 126 of transformer secondary 118. Transformer secondary 118 has its other terminal 127 connected through limiting resistor 128 to junction 130. Between junction 130 and terminal 126 of the transformer secondary is connected condenser 131. Between wire 122 and junction 130 is connected resistor 132 and rectifier 133 in series. Junction 134 between rectifier 133 and resistor 132 is connected through resistor 135 to junction 136. Between junction 136 and wire 122 is connected resistor 137. Wire 138 connects junction 136 and fixed contact 140 cooperating with movable contact 123 of a switch. Wire 138 is connected by wire 139 to control grids 140 and 140a of a pair of grid controlled gas tubes 141 and 141a respectively. These two tubes have cathodes 142 and 142a respectively, these two cathodes being connected to wire 143 going to a common terminal on secondary winding 115 and 116. These cathodes are also connected by wire 144 to bridge point 100.

Tube 141 has anode 146 connected through motor winding 147 and wire 148 to the outside terminal of secondary winding 115. Similarly, 141a has anode 146a connected through motor winding 147a to the outer terminal of secondary winding 116 by wire 148a. Windings 147 and 147a are two of the windings of motor 150. Motor 150 may be of an alternating current type having means for controlling the direction of rotation of the motor. Thus for example, windings 147 and 147a may be shading windings for an induction type motor having the usual field winding supplied by a single phase alternating current. Inasmuch as such reversible motors are well known in the art, a detailed showing is not made. Motor 150 may have suitable speed-reduced mechanism associated therewith and is mechancially connected to the control for adjusting the value of resistor 102 of the bridge.

Junction 121 is connected by wire 151 to switch 152 and thence to control grid 154 of grid controlled gas tube 155 of a type similar to tubes 141 and 141a. Tube 155 has anode 156 connected by wire 157 to one terminal of winding 158 for controlling the position of brine valve 14. The other terminal of winding 158 is connected to wire 148a.

Returning to grid 154, grid resistor 161 is connected to cathode 162 of tube 155 and is also connected to wire 144.

The operation of the system is as follows: Assume that the various switches are in the positions shown and that the system is energized. Also assume that ham 11 on scale 10 has been weighed and the base weight determined by the scale mechanism. Condenser plates 15a and 15b will be in a certain position and as a result alternating current having a certain peak value will be impressed upon control grid 67 of amplifier 68. The peak value of this alternating potential will be in direct proportion to the base weight of the ham.

The output of tube 68 is amplified by tube 80 and the resulting output is impressed on bridge point 91 through coupling condenser 89. These currents pass through the bridge to point 92. At the same time, potential from secondary 111 is impressed across bridge points 95 and 92. It will be evident that for certain fixed potentials applied as above, it will be necessary to have the bridge arm resistances (or reactances for non-resistive arms) in proper relation to obtain bridge balance across points 91 and 100. Any unbalance of these points is utilized in a Servo system.

Thus the potentials at point 91 are applied to control grids 140 and 140a of tubes 141 and 141a. The potentials at point 100 are applied to cathodes 142 and 142a of these tubes. Alternating potentials from windings 115 and 116 are 180 degrees out of phase at anodes 146 and 146a respectively. When bridge points 91 and 100 are out of balance the alternating potentials are also out of phase. Hence if the bridge unbalance is in one sense, the potential at one of the grids of tubes 141 and 141a will be in phase with one anode potential and out of phase with the other anode potential. Thus either tube 141 or 141a will fire, depending upon the sign of bridge unbalance. Motor 150 will turn in one direction or other and vary bridge resistor 102 till balance is obtained. Under conditions of bridge balance, tubes 141 and 141a will both be in the same condition, non-firing, and motor 150 will be inoperative.

Now the switches are operated. Movable contact 104 is changed to engage contact 106. This unbalances the bridge and requires a predetermined proportional change in potential at bridge point 91 to reestablish bridge balance. This change in potential will be in a direction resulting from an increase in the ham weight although the sign could be reversed for other processes. The amount of change is proportional to the original balancing potential corresponding to the base weight of the ham.

Movable contact 123 is moved from fixed contact 140. Thus a negative bias potential due to rectifier 133 is impressed through wires 138 and 139 upon the control grids of gas tubes 141 and 141a. This bias is sufficient to lock tubes 141 and 141a to non-firing and thus prevents resistor 102 from varying.

Movable contact 152 is closed against contact 153. The bridge unbalance is such that grid 154 has its potential raised to cause firing in tube 155. The space current through the tube and winding 158 opens the brine valve and ham pumping begins. When the ham weight has increased by the desired percentage, the resulting balance of the bridge causes tube 155 to stop firing and permit the normally closed valve to shut off the brine. The switches are returned to the position shown and the ham removed. It is understood that automatic means coupled to the valve control may be provided for returning the switches to the position as shown.

Instead of a variable condenser for modulating an alternating current in proportion to the ham weight other means may be used. Thus there is available a photo cell whose interelectrode space has an alternating magnetic field. A modulation action similar to a magnetron is obtained with the cell output being in the form of an alternating current whose peak value may be controlled by light falling upon the cathode. The scale platform may have means for controlling the amount of light falling upon the cathode in a manner disclosed in my copending application filed concurrently with this.

I claim:

1. In a weighing system in which the article being weighed is subject to processing causing a change in weight and in which the processing is to be terminated after said article has changed weight by a predetermined percentage of its base weight, the combination of means for generating a potential whose value is proportional to the weight of said article, a second source of potential having a substantially constant value, a bridge having four arms, at least two arms of which contain substantial resistance, means for impressing the generator output and the potential from said second source upon said bridge at different portions thereon, means for varying resistance in the bridge to balance the bridge for a base weight potential of said generator against the output of said second potential source, means for unbalancing said bridge by changing resistance in the bridge by a predetermined amount, means responsive to said bridge unbalance for initiating processing of said article, and means responsive to a condition of bridge balance for terminating the processing, said other bridge arm being unbalanced enough and in such direction as to require the generator potential to change by a predetermined proportion of the base weight potential.

2. In a weighing system in which the article to be weighed is subject to processing causing a change in weight and in which the processing is to be terminated after the base weight of said article has changed by a predetermined percentage, the combination of means for generating a potential whose value is proportional to the weight of said article, a second source of potential, said second source providing a substantially constant potential, a bridge having four arms with resistance in each arm, means for impressing said two potentials upon said bridge at different parts so that said bridge may be balanced, means effective prior to any processing of said article for varying the resistance in one bridge arm to bring said bridge to a condition of balance with the generator output potential having a value corresponding to the base weight of the article, means for varying a bridge arm by a predetermined percentage of resistance to throw the bridge out of balance, means responsive to bridge unbalance for initiating processing of said article, said bridge unbalance being in a direction such that the change of weight during article processing will cause the generator potential to vary toward a bridge balancing value and means for terminating said processing when said bridge has reached balance.

3. In a weighing system in which the article being weighed is subject to processing causing a change in weight and in which the processing is to be terminated after said article has changed weight by a predetermined percentage of its base weight, the combination of means for generating a potential whose value is proportional to the weight of said article, a second potential source having a substantially constant output potential, a bridge having substantial resistance in at least two arms, means for impressing said two potentials upon said bridge at different parts thereof so that the bridge has a balance point for any two values of potential, means responsive to bridge unbalance for varying the resistance in one bridge arm to balance said bridge when the generator potential is at a value corresponding to the base weight of the article prior to processing, means for locking said resistance varying means, means for changing the resistance in another bridge arm by a predetermined proportion and thus throw the bridge out of balance, the sense of unbalance being such that the change in generator potential during article processing tends to bring the bridge into a condition of balance, and means for terminating the processing after said bridge has reached balance during processing.

4. The system according to claim 3 wherein the means responsive to bridge unbalance for varying the resistance in one bridge arm includes a Servo means.

5. The system according to claim 3 wherein the means responsive to bridge unbalance for varying the resistance in one bridge arm includes a pair of grid controlled gas discharge tubes and Servo means.

6. The system according to claim 3 wherein the means responsive to bridge unbalance for varying the resistance in one bridge arm includes a pair of grid controlled gas discharge tubes and Servo mechanism and wherein the means for locking said resistance varying means comprises a means for impressing a bias upon both grid controlled gas tubes to prevent operation of the Servo means.

GEORGE W. REILLY, Jr.

REFERENCES CITED

The following references are of record in the file of this patent:

UNITED STATES PATENTS

| Number | Name | Date |
| --- | --- | --- |
| 2,389,113 | Reichel | Nov. 13, 1945 |